Patented Aug. 10, 1943

2,326,265

UNITED STATES PATENT OFFICE 2,326,265

UREA-FORMALDEHYDE RESIN

Pliny O. Tawney, Chicago, Ill., assignor to The Sherwin-Williams Company, Cleveland, Ohio, a corporation of Ohio No Drawing. Application June 21, 1941, Serial No. 399,207

14 Claims. (Cl. 260—70)

The present invention relates to urea-formaldehyde resins and the manufacture of such a resin which is especially suited for film-forming and coating compositions.

It is the object of the invention to produce urea-formaldehyde resins suitable for coating compositions by a new and rapid process.

It is also an object of the invention to produce urea-formaldehyde resins by a process which is more rapid and which leads to a urea-formaldehyde resin more highly desired for use in coating compositions, yet which process is cheaper and easier to operate than those hitherto known.

It is an object of the invention to produce a urea-formaldehyde resin suitable for coating compositions which is more highly compatible with alkyd resins than urea-formaldehyde resins hitherto known.

It is a further object of the invention to develop a process for manufacturing a urea-formaldehyde resin, in which the reactants, urea, formaldehyde, and an alcohol are directly converted into a resin suitable for coating purposes in a method involving a continuity of operations without the isolation of any intermediate condensation product and in one unit of equipment.

I have invented a method for producing a reaction between urea and formaldehyde initially present both as commercial aqueous formalin (40% by volume) and as paraformaldehyde in the presence of a non-aqueous solvent component, such as an alcohol, and in an alkaline medium. Moreover, I have found that after a certain period of reaction time, an alcohol which may in some cases be the same as said solvent component, preferably one that is only partially miscible with water and whose boiling point is over 100° C., may be present and further polymerization carried out in an acidic medium with simultaneous heating and distillation, so as ultimately to realize a substantially anhydrous solution of urea-formaldehyde resin in alcohol.

I am aware of processes known to the prior art for preparing urea-formaldehyde resins in which urea and aqueous formalin are condensed in an aqueous alkaline medium to form a simple crystalline product, such as dimethylol urea. This material is dried and ground and may be converted into a resinous material by warming in substantially anhydrous alcohols in the presence of acidic materials, in such a manner as disclosed in U. S. 2,019,865. Such processes require two stages, one of which involves drying and grinding of the intermediate condensation product, such as dimethylol urea. In addition, the manufacturing time is long, inasmuch as the reaction time leading to the intermediate condensation product is generally at least twelve hours.

I am further aware of another general process for preparing urea-formaldehyde resins suitable for coating compositions, in which urea and aqueous formalin are initially reacted in aqueous alkaline media until a water-soluble product is obtained. Further condensation in the presence of acidic catalyst converts the water-soluble product into a water-insoluble resinous mass as in U. S. No. 1,967,261, and the latter after washing may be brought into solution in organic solvents, as described in U. S. No. 1,762,456 (Re. 19,463) and in Re. 20,383. Urea-formaldehyde resins made in this manner in an entirely aqueous medium possess a minimum of tolerance for the inexpensive petroleum and naphtha solvents employed in the coatings industries. A more serious disadvantage lies in their relatively poor compatibility with the oil-modified glyceryl-phthalate or alkyd resins. As will be disclosed later, urea-formaldehyde resins made by my present invention are characterized by their extremely high compatibility with oil-modified alkyd types of resins. This property of my resins may be varied by uniquely controlling the variable factors that govern the course of the reaction, such as time, temperature, pH, solvents, concentration, nature of acidic catalyst employed, height of distilling column, and other factors.

Another process known to the prior art involves reaction between paraformaldehyde and urea in a non-aqueous medium and generally in an alcohol, such as for example as described in U. S. No. 1,633,337 and in No. 1,948,343. Such patents describe use of formaldehyde in the solid para form to avoid water, such as paraformaldehyde. I have found that by using mixtures of commercial aqueous formalin and of dry or moist paraformaldehyde together with an alcoholic solvent capable of forming a homogeneous system with the formalin and paraformaldehyde, a very rapid and complete reversion of the paraformaldehyde to formaldehyde occurs upon the addition of alkali. This gives the desired high proportion of formaldehyde to water. In addition, I have discovered that the nature of the alcohol governs the speed of the reaction between the aqueous-alcoholic solution of formaldehyde and the added urea. Moreover, my process starting with the initial ingredients alcohol, formalin and paraformaldehyde for a given quantity of urea is found to be more economical than the older processes in which the formaldehyde is entirely derived from a solid polymer, such as paraformaldehyde. At the same time, a urea resin is obtained by the process of this invention which is characterized by superior hardness and gloss and superior compatibility with oil-modified alkyd resins.

According to the present invention the single stage of acid catalyst condensation of the prior art is divided into two stages, the first being conducted in the presence of certain weak acids and in an aqueous alcoholic mass, and the second being conducted in the presence of stronger acids in a much less aqueous mass, and in a highly alcoholic solution.

In the preferred embodiment of my invention at least 2 moles of formaldehyde to one mole of urea are brought into reaction in an aqueous-alcoholic medium made alkaline, preferably with sodium hydroxide. The formaldehyde is furnished both by commercial aqueous formalin and by paraformaldehyde, which is available commercially as a fluffy powder with 5% water and as wet pastes. I prefer in the practice of my invention to make up the required amount of formaldehyde from the following proportions: between 60% and 50% of the formaldehyde as commercial aqueous formalin and between 40% and 50% of the required formaldehyde as paraformaldehyde. Using commercial formalin (40% by volume or 37% by weight), I make the original mass for the reaction such that there is at least by weight 1 part of formaldehyde ($CH_2O$) for 1.2 parts of water.

An alcohol or other solvent is employed which is miscible with water and the other ingredients under the reaction conditions employed, such as an alcohol selected from the group consisting of methyl, ethyl, propyl, isopropyl, normal butyl, isobutyl, secondary butyl, and tertiary butyl alcohols. Ether alcohols, such as the mono-methyl or ethyl or butyl ethers of ethylene glycol (cellosolve type) may be used in this preliminary reaction stage, to function in a solvent capacity. The higher ether-alcohols, however, such as the mono-ethyl ether of diethylene glycol (carbitol type) function chemically in the process of resin formation but are undesirable if the resin is to be used in combination with other materials containing petroleum solvents, due to the incompatibility of the unreacted portions of these higher ether-alcohols with petroleum solvents. I have also been able to use as solvent the ethyl and methyl esters of the lower hydroxy fatty acids in this stage, such as ethyl lactate or methyl-3-hydroxy butyrate.

The chief purposes of the solvent are: (a) to act as a solvent for the formaldehyde added in the form of paraformaldehyde, and (b) to decrease aquosity of the reaction mixture. The reaction mixture must be a homogeneous single phase with the given proportions of solvent, formalin, formaldehyde, alkali, and urea. Of the solvents named above, I find that normal butanol is preferred in practice.

The mixture of formalin, paraformaldehyde and alcohol after adding an amount of alkali, determined by the acidity of the formalin and of the paraformaldehyde is heated to 75° C. with stirring, in order to break up the paraformaldehyde. At 73°–75° C., the urea is added (at least one mol per 2 mols total $CH_2O$) and the process is accompanied by a cooling effect, which, in turn, is followed by a strongly exothermic and rapid reaction so that the temperature may rise as high as 82°–83° C. In practice, I find it preferable to cool the reaction mass to prevent the temperature rising about 83° C. In a few minutes the exothermic reaction is completed, but further reaction is necessary and the temperature is brought to 65° C. in twenty minutes and maintained generally between 65°–68° C. with stirring for an additional 3.5 to 4 hours. This period is called the reaction period. These details are not limitations but are presently given in order to indicate generally the character of the procedure.

I have found that the reaction period may be not longer than two hours if the temperature is on the high side and maintained around 76°–80° C., while the reaction period increases to 5 to 6 hours or longer if the temperature is on the low side and maintained between 57°–59° C. I prefer to operate between 65°–68° C. for the given period of time, since higher temperatures occasionally are conducive to an advanced degree of polymerization and to undesirable reactions, while the lower temperatures and the accompanying longer reaction times are undesirable from the standpoint of economy. I have also found that the reaction period may be decreased to two hours or even less at 65°–68° C. by increasing the alkalinity of the reaction medium. The decomposition of paraformaldehyde into monomeric formaldehyde is catalyzed by increased alkalinity; however, the increased concentration of hydroxyl ions promotes a much higher degree of polymerization between the urea and the formaldehyde than I find generally desirable. Therefore, I prefer to use a minimum of alkali to decompose the paraformaldehyde.

At the end of the reaction time, according to my invention, I add a solvent alcohol A, preferably n-butanol and a weak acid catalyst. Thereupon, distilling and stirring are begun and the temperature is raised to 94° C. (or higher) at which point I add more of the reacting alcohol A, such as n-butanol, or I may choose to add a still higher boiling alcohol B of greater molecular weight, such as 2-ethyl-hexanol-1. At the same time I add a strong acidic catalyst. Distilling and stirring are continued until the temperature reaches 110° C. or higher for completion of the reaction. At this point I may add a suitable diluent such as commercial xylenes or hydrogenated naphthas or alcohol, with or without cooling, so as to enable filtration to be carried on conveniently.

The term weak acid as used in the present invention is confined to acids which have a dissociation constant in the range from 0.000214 to 0.14, said limits being represented respectively by formic acid and pyrophosphoric acid. Both of these are operable. Formic acid is barely operable, and no acids weaker than formic have been found operable, such as acetic and butyric acids. Acids having a dissociation constant higher than pyrophosphoric acid, when used in hydrogen equivalent proportions to the operable acids, produce premature gellation of the aqueous alcoholic reaction mixture. Many acids in the given range have been employed, and may be classed into three groups (1) operable, (2) inoperable, and (3) operable but undesirable. Operable acids in group (1) may be organic or inorganic, monobasic or polybasic, such as formic, phthalic, citric, phosphorus, phosphoric, pyrophosphoric, malic, citric, tartaric, oxalic, maleic, and salicylic. In group 3, the following acids are undesirable because of producing oxidation, or of toxicity, or because of color formation or thermal decomposition: iodic, periodic, salicylic (color-forming) arsenic, arsenious, and picric. Deletions and additions to this list may obviously be made on the basis of circumstantial desirability. A red color from use of salicylic acid may be desirable in some cases. Inoperable acids in group 2 are those which have an anion-forming portion of the molecule which hydrolyzes in the reaction to produce as a hydrolytic product a new acid having a dissociation constant above 0.14. Such acids are bromacetic, chloracetic, dibromacetic and dichloracetic.

As a result, the weak acid must be one which in the course of the reaction permits the condensation to occur in the presence of one or more acids, each having a dissociation constant not greater than 0.14 with at least one acid in the said range. In other words, hydrolysis or secondary dissociation of an acid having a measurable dissociation constant in a given range, may occur, so long as a product thereof does not have a dissociation constant greater than 0.14.

The term strong acidic catalyst as used in the present invention includes known acidic catalysts which are strong in essentially alcoholic solutions as well as in aqueous solutions, such as hydrochloric acid, hydrobromic acid, hydroiodic acid, perchloric acid, benzene sulfonic acid, toluene sulfonic acid, zinc chloride, iron chloride, and aluminum chloride, or substances which can give rise to these in the reaction mixture, such as boron fluoride, chloracetyl chloride, benzoyl chloride, and phosphorus trichloride. Such classification is described by Hammett, Physical Organic Chemistry, (1940) page 261. Some of the classified compounds are undesirable such as hydroiodic acid, on account of oxidation, iron chloride on account of color, and perchloric acid on account of oxidation and explosive hazard. The strong acids, when used in hydrogen-equivalent amounts for the weak acid, in the first stage of acid condensation, produce gelling, and hence their use is avoided in said stage in order to avoid the gelling. It is the combination of strong acidity and aquosity in the first acid stage which effects gelling. In the second acid stage the aquosity is greatly reduced, and hence the danger of gelling does not exist with the effective amount of the stronger acidic catalyst.

The alcohol A that is added should have a boiling point over 100° C., so that during distillation the reaction mixture will be continually dehydrated. An additional requirement of alcohol A is that it be capable of forming a homogeneous system with the acidified reaction mixture at the temperature at which distillation begins, when used in the necessary proportions. I prefer to operate with n-butanol, and the amount present should be a sufficient quantity to reduce the aquosity of the resin-reacting mixture arising from the water in the ingredients employed to not over 20% by weight of the total content. The quantity of alcohol added (at 94° C. or higher) for practical operations, which may be either more of alcohol A, such as n-butanol, or the higher boiling alcohol B, has been found to be at least equal to 20% of the amount of alcohol A first added. I have found that in the cases in which higher alcohols are added here, they may be added in amounts as high as 40% of the weight of the first batch of alcohol A. The residue of the lower boiling alcohol A may then be distilled from the reaction mixture. Where alcohol B is used any of the lower boiling alcohol A that has chemically united with the urea resin will probably be replaced in the chemical union by the higher boiling alcohol B through a process of radical interchange, and the previously combined alcohol A will be distilled off. Whether or not this is so, alcohol remains combined.

The alkali used is a factor entering into the determination of amounts of other materials used. Commercial aqueous formalin has variable amounts of formic acid. To avoid any adverse effect from such acid, I prefer to standardize the formalin before using it in this invention. I have chosen an arbitrary standard of pH 8.25. In attaining this I measure the amount of alkali, preferably sodium hydroxide, used to standardize the formalin. Then I use a minimum additional amount of the same alkali necessary to effect the decomposition of the paraformaldehyde for the temperature I prefer to employ. This may be determined and plotted for any set of conditions. In the examples given later, these amounts are illustrated. The total alkali employed for these two functions is recorded to serve as a basis for determining the amount of weak acid catalyst to be added. The more formic acid present, the more the sodium formate, and hence the greater the buffering action of the sodium formate. Consequently, proportionately greater quantities of the second amount of alkali and of the weak acid catalyst are required to attain the same degree of reaction as when less formic acid is initially present. It is possible arbitrarily to elevate the acidity of the aqueous formalin to a fixed degree by adding formic acid (see Example 9).

After the initial reaction period under alkaline conditions, which forms a preliminary condensation product, I use a weak acid catalyst as the first acid catalyst in order to continue the condensation under acid conditions, and to initiate the reaction between the resulting product and alcohol. Choice of catalyst is one control over viscosity of resin. The amount of weak acid catalyst required is determined more or less empirically by the effect produced when distillation begins (90° to 93° C. where solvent is tertiary butanol). At this point the controlling effect is substantial homogeneity. Too weak a catalyst fails to advance the condensation to a suitable degree, indicated by cloudiness. Too strong a catalyst advances the condensation to produce an insoluble gel before attaining the point where homogeneity is desired. If more alkali is used in hypothetical case A than in hypothetical case B, the conditions otherwise being the same, it is necessary to add more weak acid catalyst in case A than in case B.

I have discovered that the addition of a strong acidic catalyst to the reaction mixture at 94° C. or above, when the concentration of water in the reaction mixture has been greatly reduced, leads to a final resin having superior compatibility with oil modified glyceryl phthalate resins. The presence of strong acid at this stage is not essential for resin formation, but it is necessary to give the resin the desired high degree of compatability with oil-modified alkyd resins. The presence of too much acid is easily ascertained, because it produces a gel which is an undesired insoluble product. Where such excess is encountered, the amount must be empirically reduced to avoid the gel. If too greatly reduced, the desired compatability is reduced. The strong acid, particularly hydrochloric acid, is a well known catalyst for the reaction between aldehyde or ketone groups, with alcohols to form acetals.

The initial condensation product of urea and formaldehyde presents activity in acetal formation acting as if it contained free aldehyde groups.

During the alkaline stage of this reaction, the first reaction consists of a condensation between urea and formaldehyde leading to a dimethylol urea. Under the conditions of temperature, concentration of reactants, alkalinity, and reaction time which I employ in my invention, however, the reaction does not stop with dimethylol urea but proceeds to more complex products. The structures of the latter are somewhat obscure and it is generally accepted that they are condensation products of dimethylol urea, itself. They are completely soluble in the reaction medium and at the end of the reaction period of 3 to 4 hours at 65° to 68° C. the reaction mixture is entirely clear, water-white and homogeneous.

Upon the addition of alcohol A at this point, such as n-butanol, followed by the first and weak acid catalyst, the aquosity of the reaction mixture is low, for example about 13%. Adding said acid catalyst destroys the clarity. Upon heating, the reaction mass again becomes clear and water-white, indicating that the water-soluble products of the alkaline condensation have been transformed into a condensation product which is somewhat hydrophobic. This is evidenced by the fact that adding water to the mass causes it to precipitate, but adding alcohol does not affect it. Since methylol groups, which are present in the hydrophobic resin, are constitutionally effective as aldehyde groups, it is my opinion that the strong acid, such as hydrochloric acid, catalyses an acetal reaction between the alcohol present, such as n-butanol, and the methylol groups.

It is a well known physical and chemical fact that structurally similar bodies are more likely to have high degrees of compatibility with each other than bodies which are dissimilar structurally. In urea resins made by prior art processes, there is evidently a much higher proportion of methylol groups unreacted with the alcohols and methylol groups existing in the free state. This is indicated by the fact that the prior-art urea-formaldehyde resins exhibit a limited degree of compatibility with oil-modified glyceryl phthalate resins (alkyd resins) made with the theoretically required amount of glycerine. However, these prior urea resins become more and more compatible as the amount of glycerine increases. By increasing the excess glycerine in the oil-modified glyceryl phthalate resin up to 30%, or in other words, by increasing the number of free hydroxyl groups, the structural similarity to the unreacted methylol groups in prior art urea formaldehyde resins becomes much greater and therefore, greater compatibility results. However, the use of excess glycerine (or other polyhydric alcohol) in the oil-modified alkyd resins possesses the disadvantages of conferring decreased water resistance to the resin, and of being uneconomical.

I have discovered that the treatment of the resin solution with the strong acid, such as hydrochloric acid, during the reaction and at a time when most of the water has been removed, leads to a final urea-formaldehyde resin possessing great compatibility with oil-modified glyceryl phthalate resins made with the theoretically required amount of glycerine. This indicates that my urea resins possess a minimum of free methylol groups; presumably they have condensed with the alcoholic solvent. This is further supported by the fact that it is impossible to recover all the alcohol used in a process, after accounting for mechanical losses. In addition, the urea resin solutions manufactured according to my invention exhibit much higher tolerance for hydrocarbon solvents than do the prior art resins.

An important advantage of the processes of this invention resides in the fact that resin solutions of widely differing viscosities are easily manufactured from reaction mixtures having the same initial composition by altering the height of the distilling column on the reaction vessel. I have discovered that as the column is shortened, the viscosities of the final resin solutions become greater, whereas lengthening of the column produces final resin solutions which are less viscous. I have found that distillation from the shorter column produces a smaller ratio of water to normal-butanol in the distillate than does distillation from a long column. I have also found that a higher distillation column minimizes escape of formaldehyde, giving more of it in the resulting resin, following the rule that increased formaldehyde content gives lower viscosity. In other words, at any point in the process, there will be a greater amount of water in the reaction vessel equipped with the short column than in the one having the long column. The length of tube may control the aquosity during distillation. Consequently, upon the addition of the strong acidic catalyst, such as hydrochloric acid, the excess of water inhibits etherification between alcohol and methylol groups to some extent, and makes possible interaction between methylol groups themselves. This leads to cross-linking and higher viscosity, which is desirable in some types of resins for coating compositions. I have found also that for a given height of distillation column and for a given proportion of reactants, the viscosity of the final 50% resin solutions can be varied by varying the quantity of paraformaldehyde. Generally, the greater the amount of paraformaldehyde, the lower will be the viscosity of the resin solution.

The invention is illustrated by numerous examples, in which the "parts" given are parts by weight.

Example 1

The pH of 833 parts by weight of aqueous formalin (40% by volume) is adjusted to 8.25 with NaOH, as a 9.52% by weight solution. 222 parts of 95% paraformaldehyde, 500 parts of tertiary butanol, and 4.04 parts of 9.52% sodium hydroxide solution are added. The mixture is heated to 74° C. under reflux and the heating stopped at this point. 485 parts of urea are added and the temperature rises to 79° C. after first falling to 57° C. due to the strong cooling effect. The temperature is held between 65° to 68° C. for 4 hours from the time of addition of the urea. During this period the reaction mixture is stirred and maintained under reflux.

At the end of four hours, 2000 parts of n-butanol are added, followed by 2.4 parts of the dihydrate of oxalic acid. Heating and distillation are begun and continued until the temperature is 100° C. Hereupon, 400 parts of n-butanol and 6.7 parts of 4.9% HCl solution in n-butanol (made by diluting 1 volume of 28% aqueous hydrochloric acid solution with 10 volumes of n-butanol), are added to the reaction vessel, and heating and distillation with stirring resumed. When the temperature reaches 125.5° C. heating is discontinued and 505 parts of mixed xylenes are run in. 2125 parts of colorless resin solution are obtained which may be filtered to remove suspended foreign matter. The solution contains approximately 50% resin solids and possesses a viscosity of U (Gardner-Holdt) Paint and Varnish Maker's standard.

*Example 2*

The identical reaction described in Example 1 (which was carried out in a flask with no distilling head) is carried out in the same 5-liter flask equipped with a plain-glass, 9-inch distilling head. The final 50% solution has a viscosity of R (Gardner-Holdt). By merely lengthening the column, the same reaction gives a product having a viscosity of G.

*Example 3*

The pH of 833 parts of formalin (40% by volume) is adjusted to 8.25 with NaOH, as in Example 1. 222 parts of 95% paraformaldehyde, 500 parts of secondary butanol, and 4.04 parts of 9.52% NaOH solution are added, and the mixture heated and stirred to 74° C. 485 parts of urea are added and after the exothermic reaction is completed (about 10 minutes), the reaction mixture is brought to 68° C. and held for 3¾ hours.

2000 parts of n-butanol and 2.4 parts of the dihydrate of oxalic acid are added and heating and distillation carried on until the temperature of the reaction mass is 100.5° C. 400 parts of n-butanol and 8.35 parts of the said 4.9% HCl in n-butanol are added, and heating and distillation resumed. When the temperature reaches 123.3° C. the heating is discontinued and 415 parts of commercial xylenes are added. The mixture may be filtered hot. 2090 parts of a solution containing 50%±1% resin are secured. It possesses a viscosity of V (Gardner-Holdt).

*Example 4*

833 parts of formalin adjusted to a pH of 8.35, 222 parts of 95% paraformaldehyde, 500 parts of tertiary butanol, 3.82 parts of 9.52% NaOH, and the 485 urea are brought into reaction as disclosed in Example 1. After the alkaline reaction period is concluded, 2000 parts of n-butanol and 2.3 parts of the dihydrate of oxalic acid are added and distillation carried on until the temperature of the reaction mass is 99° C.

At this point, I add 700 parts of 2-ethyl-hexyl alcohol and 6.7 parts of 4.9% HCl in n-butanol. Distillation is resumed and carried on until the temperature of the reaction mixture is 139° C. Heating is discontinued and 288 parts additional of 2-ethyl-hexanol are added. 2275 parts of product are obtained, which contains approximately 50% resin. The solution has a viscosity of U to V (Gardner-Holdt).

*Example 5*

833 parts of formalin (40% by volume) are adjusted to a pH of 8.25 and 222 parts of 95% paraformaldehyde, 500 parts of the butyl ether of ethylene glycol (butyl cellosolve), and 4.10 parts of 9.52% NaOH are added. The mixture is heated to 74.4° C. and 485 parts of urea are added.

After the exothermic reaction has subsided (15 minutes), the reaction mass is stirred and maintained between 65° to 68° C. for 4 hours. Thereupon are added 1800 parts of n-butanol and 2.6 parts of the dihydrate of oxalic acid. Distillation is begun and carried on until the temperature of the reaction mass is 110° C., when 1545 parts of distillate have been secured. 200 parts of butyl cellosolve and 7.52 parts of 4.9% HCl in n-butanol are added and distillation resumed. When the temperature reaches 136.5° C., an additional 630 parts of distillate will have been taken off and heating is stopped. 242 parts of butyl cellosolve are added to the reaction mixture. The hot solution may be filtered to remove foreign matter and 2080 parts of product are secured, containing 60%±1% of resin. The solution possesses a viscosity of Z (Gardner-Holdt).

*Example 6*

833 parts of commercial formalin are adjusted to a pH of 8.25 with NaOH. 222 parts of 95% paraformaldehyde, 500 parts of tertiary butanol, and 5.46 parts of 9.52% NaOH solution are added and the mixture heated to 71° C. 485 parts of urea are added and after the usual exothermic reaction has abated, the reaction mixture is held 2 hours at 65°–68° C.

2000 parts of n-butanol and 2.6 parts of the dihydrate of oxalic acid are added, and distillation carried on until the temperature of the mass is 98.3° C. 400 parts of n-butanol and 6.7 parts of 4.9% HCl in n-butanol are added, and distillation continued until the temperature is 124.4° C. 460 parts of commercial xylenes are added, and the solution may be filtered. It contains 50% resin and has a viscosity of S. (Gardner-Holdt).

*Example 7*

833 parts of formalin (40% by volume) are adjusted to a pH of 8.25 with NaOH solution. 222 parts of 95% paraformaldehyde, 500 parts of tertiary butanol, and 4.15 parts of 9.52% NaOH solution are added. The mixture is heated to 74.5° C., 485 parts of urea are added and after the usual exothermic reaction is concluded, the mass is maintained between 65°–68° C. for 3.5 hours.

2000 parts of n-butanol and 3.8 parts of 85% phosphoric acid are added, and distillation carried on until the temperature of the mass is 99° C. 400 parts of n-butanol and 4.18 parts of 4.9% HCl in n-butanol are added and distillation continued until the temperature is 123.3° C. 390 parts of commercial xylenes are added and the mixture filtered. 2050 parts of a solution containing 50% resin are obtained. It has a viscosity of U–V (Gardner-Holdt).

*Example 8*

The process described in Example 1 is carried out identically, with the exception that the 4.9% HCl in n-butanol is omitted from the reaction. 2125 parts of resin solution are obtained, containing 50% resin. The solution has a viscosity of T–U.

This resin does not have as much tolerance for petroleum solvents as the resin produced by Example 1. Neither does it have quite as much compatibility with oil-modified glyceryl phthalates. These facts indicate conclusively that the addition of a second catalyst during the process of resin formation leads to a highly desirable product for coating purposes, without adversely affecting the viscosity or the stability.

*Example 9*

833 parts of commercial formalin (40% by volume) reinforced with 0.18 parts of 87% formic acid are adjusted to a pH of 8.27 with 3.6 parts of 9.52% NaOH solution. 222 parts of 95% paraformaldehyde, 500 parts of tertiary butanol, and 5.03 parts of 9.52% NaOH are added and the mixture warmed to 74° C. 485 parts of urea are added and after the exothermic reaction is completed, the temperature is maintained between 65–68° C. for 3¼ hours.

2000 parts of n-butanol and 3.1 parts of the dihydrate of oxalic acid are added and distillation carried on until the temperature of the mass reaches 99° C. 400 parts of n-butanol and 9.2 parts of 4.9% HCl in n-butanol are added and distillation resumed. When the temperature of the reaction mixture reaches 124.5° C. heating is discontinued and 430 parts of commercial xylenes are added. 2085 parts of solution are obtained, containing 50% resin. It may be filtered to remove suspended matter. The viscosity of the solution is U–V.

Example 10

833 parts by weight of formalin (40% by volume) are adjusted to a pH of 8.25 with NaOH. 260 parts of 95% paraformaldehyde, 500 parts of tertiary butanol, and 4.75 parts of 9.52% NaOH solution are added and the mixture warmed with stirring to 72° C. 485 parts of urea are added and after the exothermic reaction has moderated the temperature is maintained between 72° to 74° C. for an additional 3½ hours.

2000 parts of n-butanol and 2.55 parts of oxalic acid dihydrate are added and distillation carried on until the temperature of the reaction mass is 99° C. 400 parts of n-butanol and 6.5 parts of 4.9% HCl in n-butanol are added and distillation is resumed. When the temperature reaches 124.5° C., heating is discontinued and 450 parts of commercial xylenes are added. 2175 parts of a solution containing 50% resin are secure. It has a body of H–I (Gardner-Holdt). This example increases the effective quantity of formaldehyde over the previous examples.

Example 11

The process of Example 1 is carried out identically except that the 6.7 parts of alcoholic HCl are omitted and 0.25 parts of anhydrous aluminum chloride are added instead. The final resin solution has practically identical properties with those of the resin solution prepared in Example 1.

Example 12

The pH of 833 parts of aqueous formalin (40% by volume) is adjusted to 8.25 with NaOH solution. 330 parts of 95% paraformaldehyde, 650 parts of tertiary butanol, and 6.11 parts of 9.52% NaOH solution are added and the mixture heated with stirring to 74° C. 485 parts of urea are added and, after the usual exothermic reaction has moderated, the temperature is maintained between 66° C. and 69° C. for an additional 3.5 hours.

1900 parts of n-butanol and 2.9 parts of the dihydrate of oxalic acid are added and heating and distillation begun. When the temperature reaches 99° C., 400 parts additional of n-butanol are added together with 6.7 parts of 4.9% alcoholic HCl solution. Distillation is resumed and carried on until the temperature of the reaction mass is 129° C. The heating is discontinued and 585 parts of commercial mixed xylenes are run into the hot mass, which may then be filtered. The yield is about 2340 parts of solution, containing 50% resin by weight. This 50% resinous solution has a viscosity of B to C (Gardner-Holdt).

Example 13

833 parts of aqueous formalin (40% by volume) are adjusted to a pH of 8.25 with NaOH solution. 224 parts of 95% paraformaldehyde, 400 parts of n-butanol, and 3.82 parts of 9.52% NaOH solution are added, followed by warming and stirring to 74° C. 485 parts of urea are added and after the exothermic reaction has subsided, the reaction mass is held between 71° and 73° C. for 3.5 hours.

1500 parts of n-butanol and 2.1 parts of the dihydrate of oxalic acid are added, and distillation commenced. When the temperature reaches 98° C., 500 parts more of n-butanol and 4.2 parts of 4.9% alcoholic HCl are added and distillation resumed. Heating is stopped when the temperature of the reaction mass reaches 122° C., and 460 parts of commercial mixed xylenes are added. Upon filtering and cooling, 2130 parts of resin solution are obtained, containing approximately 50% resin. The solution has a viscosity of S–T (Gardner-Holdt). This is the preferred procedure exemplifying the use of n-butanol throughout. When the oxalic acid is substituted by 4.8 parts of phthalic acid, the resulting resin has a viscosity of H (Gardner-Holdt).

Example 14

833 parts of aqueous formalin (40% by volume) are adjusted to a pH of 8.26 with NaOH solution. 222 parts of 95% paraformaldehyde, 500 parts of tertiary butanol and 4.05 parts of 9.52% NaOH solution are added. The temperature is raised to 74° C. with stirring and 485 parts of urea added. After the exothermic reaction is completed, the reaction mass is held between 68° C. and 70° C. for 3.5 hours.

2000 parts of iso-butanol and 2.4 parts of the dihydrate of oxalic acid are added and distillation then begun. When the temperature of the reaction mass reaches 94.5° C. 800 parts additional of isobutanol and 4.18 parts of 4.9% alcoholic HCl are added and distillation continued. Heating is stopped when the temperature of the mass reaches 110° C., and 400 parts of mixed xylenes are run in. 2210 parts of resin solution are obtained, which has a viscosity of T (Gardner-Holdt).

Example 15

833 parts of aqueous formalin (40% by volume) are adjusted to a pH of 8.20 with NaOH solution. 354 parts of an aqueous paste of paraformaldehyde (35% water content), 400 parts of tertiary butanol and 4.15 parts of 9.52% NaOH solution are added and the mixture heated with agitation to 74° C. 485 parts of urea are added, and after the attendant exothermic reaction has subsided, the temperature is held between 67° and 69° C. for 3.5 hours.

2000 parts of n-butanol and 2.25 parts of the dihydrate of oxalic acid are added and heating and distillation begun. When the temperature of the reaction mixture is 99° C., 400 parts of n-butanol and 6.25 parts of 4.9% alcoholic HCl are added and distillation continued until the temperature of the reaction mass is 123° C. Heating is stopped and 465 parts of mixed xylenes added. 2145 parts of product are obtained, containing 50% resin and having a viscosity of Q.

Example 16

625 parts of aqueous formalin (40% by volume) are adjusted to a pH of 8.25 with NaOH solution. 168 parts of 95% paraformaldehyde, 300 parts of n-butanol, and 2.86 parts of 9.52% NaOH solution are added, followed by stirring while warming to 74° C. Then 364 parts of urea are added and after the exothermic reaction has subsided, the reaction mass is held at 71° C. for 3.5 hours.

1125 parts of n-butanol and 5.6 parts of citric acid are added and distillation is commenced. When the temperature reaches 100° C., 450 parts of n-butanol and 4.6 parts of alcoholic HCl of 4.9% strength are added and distillation resumed. When the reaction mass has attained 127° C., the heating is stopped and 405 parts of commercial mixed xylenes are added. Upon filtering and cooling, 1645 parts of resin solution are obtained, containing 50% resin. The solution has a viscosity of M (Gardner-Holdt).

Examples 17 to 23

In modifications of Example 16, changes have been made, which with the results, are shown in the following table:

| Example | Weak acid catalyst | Parts by weight | Strong acid catalyst | Parts by weight | Final temp. °C. | Viscosity of 50% solution | Weight parts yield of 50% resin solution |
|---|---|---|---|---|---|---|---|
| 17 | Formic | 3.0 (87%) | 35% aqueous p-toluene sulfonic acid | 3.2 | 127.7 | E—E | 1,778 |
| 18 | Malic | 4.7 | Zinc chloride | 0.2 | 133 | O | 1,628 |
| 19 | Salicylic | 3 | 4.9% alcoholic HCl | 4.6 | 131.6 | J | 1,625 |
| 20 | Tartaric | 3.65 | ---do--- | 4.6 | 127.2 | R—S | 1,710 |
| 21 | Maleic | 1.8 | ---do--- | 4.6 | 123 | N—O | 1,622 |
| 22 | Phosphorus | 1.15 | Chloracetyl chloride | 0.16 | 124 | T | 1,584 |
| 23 | Pyrophosphoric | 2.0 | 4.9% alcoholic HCl | 4.6 | 125 | V | 1,595 |

Other acids have been attempted in Example 16 for the weak acid. When 1.5 parts of glacial acetic acid was used for the citric acid, incomplete resinification resulted. The final hot reaction mixture was clear after filtering, but became cloudy and opaque on cooling, depositing a slimy white precipitate. The same was true, using 10.4 parts of butyric acid. When 8.35 parts of 4.9% alcoholic HCl was used for the citric acid, the reaction mixture gelled.

Attempts to use 3.5 and 2.5 parts, respectively, of para- and meta-nitrobenzoic acid, for the citric acid of Example 16, permitted carrying out the procedure, but gave opaque cold products, due to incomplete resinification. These acids, and others giving the opaque product, have too low dissociation constants.

The following table summarizes examples, showing the various weak acids, their dissociation constants, the viscosity of the final 50% resin solution in xylenes; and an estimate of their relative workability in the invention. It is to be noted that in general, as the acid strength rises, the operability improves, and the viscosity rises in the scale.

| Example | Weak acid | Dissociation constant | Viscosity of 50% resin solution | Estimated character of example |
|---|---|---|---|---|
|  | Butyric | 0.0000148 |  | Poor. |
|  | Acetic | 0.0000186 |  | Do. |
| 17 | Formic | 0.000214 | E—F | Fair. |
| 18 | Malic | 0.0004 | O | Good. |
| 16 | Citric | 0.0008 | M | Do. |
| 19 | Salicylic | 0.00106 | J | Do. |
| 20 | Tartaric | 0.0011 | R—S | Do. |
| 13 (end) | Phthalic | 0.00126 | H | Excellent. |
| 7 | Phosphoric | 0.011 | U—V | Do. |
| 21 | Maleic | 0.015 | N—O | Do. |
| 1-4, 6, 9, 11, 14, 15 | Oxalic | 0.038 | Q, R—V | Do. |
| 22 | Phosphorus | 0.05 | T | Do. |
| 23 | Pyrophosphoric | 0.14 | U | Do. |

The following table shows variations in the second catalyst, it being observed that in some cases, none is added, the hold-over of the weak acid catalyst being employed.

| Second catalyst | Example |
|---|---|
| Hydrochloric acid | 1-7, 9, 10, 12-16, 19-21, 23. |
| Hold-over of oxalic | 8. |
| Aluminum chloride | 11. |
| p-Toluene sulfonic acid | 17. |
| Zinc chloride | 18. |
| Chloracetyl chloride | 22. |

The resins made by the above examples are illustrative of the products that may be secured by my invention, but I do not wish my invention to be limited to the examples given.

These resins find many useful applications in coating compositions, especially when used in composition with oil-modified glyceryl phthalates. An example of such an oil-modified glyceryl phthalate is the following: 384 parts of 98% glycerine and 700 parts of phthalic anhydride are heated to 205° C. in 25 minutes. When this point is reached, slowly add 800 parts of sunflower seed fatty acids and continue heating at 205° C. under an inert atmosphere for 15 minutes. The temperature is raised to 260° C. and held at this point for 15 to 30 minutes, whereupon blowing with inert gas is effected for 30 minutes at the same temperature. The blowing is continued at 205° C. until the acid value has dropped below eight. (See discussion of acid value immediately following.) The resin is thinned with high solvent naphtha and xylene to 50% solids. The above resin is an oil-modified alkyd resin, and it will be observed that the oil-modifier consists of the unmodified molecules of sunflower seed fatty acids. Prior art urea resins are not readily compatible with this type of oil-modified alkyd resin, but where the oil-modifier is more highly hydroxylated, there is a ready compatibility. It is characteristic of the resins of this invention that they are more highly compatible with the oil-modified alkyd resins than are the prior art urea resins. Thus, use of them in conjunction with available oil-modified alkyd resins permits economy in providing the latter, rather than the specially hydroxylated type, so hydroxylated for greater compatibility.

Acid value

Unity in acid value or acid number of a resin means that 1 gram of resin requires 1 milligram of potassium hydroxide to neutralize it. The acidity of a resin which may be hardened is pertinent to its commercial utility.

It will be observed that the above alkyd resin contains only the theoretically required amount of glycerine. Urea-formaldehyde resins known to the prior art are not readily compatible with oil-modified alkyd resins of this type, and poor compatibility adversely affects the gloss and the hardness of the enamels in which the combination of alkyd and urea-formaldehyde resins is used. Urea resins produced by this invention are characterized by their superior compatibility with oil-modified glyceryl phthalates, even those in which only theoretical amounts of glycerine are used. The resulting enamels have high gloss and are very hard.

100 parts by weight of the 50% resin solution of Example 1 and 100 parts by weight of the 50% oil-modified glyceryl phthalate described above are blended in the cold, forming a clear mixture. After application to a surface, such as metal, by dipping or spraying, it will give a clear hard film upon baking for one hour at 120° C. By incorporating pigments, such as titanium dioxide or zinc oxide, enamels are secured which are characterized by high gloss, hardness, and remarkable resistance to water and alkalies.

When the above described oil-modified alkyd resin is applied alone to a surface, an hour bake at 120° C. gives a very soft film which is readily attacked by alkalies. Moreover, the film has poor light resistance and inferior resistance to water and grease.

The urea resins produced by my invention are capable of being used with a wide variety of alkyd resins, not being limited to the alkyd resin above described, and accordingly are adaptable to a large number of coating purposes. They lead to fine enamels for metal surfaces, such as in toys, washing machines, refrigerators, and automobile bodies. Moreover, I have found that by incorporating suitable catalysts, the combination of oil-modified glyceryl phthalate resin and the urea resin, say of Example 1, can be made to bake hard at temperatures lower than 120° C. For example, 100 parts by weight of the 50% urea-resin solution of Example 1 are blended in the cold with 100 parts by weight of the above described oil-modified glyceryl phthalate. To this mixture, I add 0.30 part by weight of gamma-bromo-gamma-phenyl butyric acid and stir until completely dissolved. When this solution is applied to any surface, including wood, say of a cabinet, it bakes completely hard and tack-free in one hour at 175° F. This is the upper temperature limit for baking compositions onto wood. The film has considerable resistance to water, alkali, grease, and to marring. Moreover, when the same solution is applied to a metallic or other surface and allowed to dry in contact with the air, it slowly hardens in the course of several hours, making baking unnecessary. This hardening continues with age.

An important advantage of my invention lies in the fact that it is easy to make resins either of low viscosities or of high viscosities either by controlling the length of column in the reaction apparatus, or by controlling formaldehyde content. Those familiar with the coating compositions are aware that for different purposes resins of differing viscosities are required. For example, an enamel for refrigerators should contain a high percentage of solids and this demands a resin of low viscosity. An enamel for coating toys, for example, requires a low percentage of solid material and a resin of high viscosity. As disclosed in Examples 1 and 2, I can readily secure resins of either type by altering the size of the fractionating column. Generally, for a fixed ratio of reactants, the shorter the column, the heavier will be the viscosity of the final resin.

Another important advantage of my process lies in the fact that it offers many economies in time, in apparatus, and in materials. I have found that a complete cycle can be easily attained in not more than seven hours. This contrasts very favorably with processes known to the prior art for making urea-resins, which require as much as 48 hours, or longer, for a complete cycle. Moreover, I find that my process can readily be carried out in a single piece of apparatus, such as a still equipped with an efficient agitator. Generally, I prefer to use glass-lined equipment although I can use copper or stainless steel or nickel-lined reaction vessels. I find that my processes are economical in that the mixture of alcohol and water collected in the distillate during the course of a reaction may be reused after simple drying and fractional distillation.

The invention involves control of aquosity to produce the kind of resin desired. Ordinarily aqueous formalin is employed to provide all the formaldehyde. This introduces too much water. I provide only part of the formaldehyde as formalin in order to reduce the aquosity, and provide the remainder of the formaldehyde in a way which introduces less accompanying water than use of aqueous formalin. I prefer to do this by use of paraformaldehyde in a form having a formaldehyde equivalent over 40% by weight, and to decompose it into formaldehyde by suitable means, using preferably the same alkali which I require later for catalysis. It is therefore obvious that the proportion of aqueous formalin to paraformaldehyde may vary according to other factors, in order to secure the suitable aquosity for the result. Paraformaldehyde does not enter into the reaction, and it is only a less aqueous source of formaldehyde than is aqueous formalin. Hence it is obvious that I may use other less aqueous sources, such as gaseous formaldehyde, or alcoholic formalin solutions. The essential requirement ultimately to be met is the preparation of a reaction mass of reacting proportions of urea and formaldehyde for an alkaline catalyst, and a liquid medium for the reaction which gives a homogeneous single phase after the initial condensation, which medium has a low aquosity due to a small amount of water and large amount of water-miscible diluent. The diluent may be an alcohol which in a later stage of the reaction in the presence of an acid catalyst, becomes a reactant with the alkaline-catalyzed condensation product of urea and formaldehyde. The actual amount of water is not greater than 120% of the actual amount of formaldehyde, and the amount of non-aqueous diluent is sufficient to give homogeneity before reaction begins. In the examples given the aquosity by weight, arising from water in the ingredients employed, is less than 20% at beginning of distillation. Although I prefer to carry out the addition of alcohol or alcohol and solvent in two stages, it is to be understood that it may be added by any convenient procedure which preserves homogeneous solution and permits removal of substantially all the water during the distillation. This has been accomplished by dropping alcohol slowly into the still during distillation.

The foregoing description and explanation of the invention are not to be considered as limiting it to the examples given. Numerous modifications and changes will occur to those skilled in the art, and are contemplated as falling within the scope of the invention as defined in the appended claims.

This application is a continuation-in-part of my application Serial No. 269,409, filed April 22, 1939.

I claim:

1. The method of making a urea-formaldehyde condensation product which comprises condensing in the presence of an alkaline catalyst at least 2 moles of formaldehyde and 1 mole of urea in an aqueous solvent mixture comprising water and a volatile organic solvent, said solvent mixture producing a solvent for the initial ingredients and for the condensation product at the end of the reaction, said reaction mass having initially at least 1 part by weight of formaldehyde to 1.2 parts by weight of water, and a non-aqueous solvent component miscible with water, said reaction being carried out at a temperature from 57° C. to 80° C. for a period from 2 to 6 hours to form a homogeneous reaction solution containing a condensation product, the longer time corresponding to the lower temperature; reducing the aquosity arising from water in the ingredients employed to not more than 20% by weight by adding to the mass an acid catalyst and a solvent alcohol miscible with the reaction mass when beginning the next step and boiling over 100° C., said acid catalyst being an acid having a dissociation constant in the range from 0.000214 to 0.14 and being one which has an anion-forming portion of its molecule non-hydrolyzable to form an acid having a dissociation constant greater than 0.14, whereby the aqueous mass is non-gelling in the progress of the acid catalyzed condensation; distilling the mass to remove water whereby an acid catalyzed condensation occurs producing a homogeneous reaction mass, whereby as distillation is continued volatile matter including water is driven off, condensation is continued, and the reactant mass forms a homogeneous syrup; then when the reaction mass is a syrup at a temperature of at least 94° C. adding a strong acidic catalyst of a character so much stronger than the said weak acid that if used in place of said weak acid catalyst it will produce gelling of the mass, and continuing the distillation to remove residual water and excess alcohol to attain at a temperature well over 100° C. a substantially water-free syrup which is capable of dilution with a solvent to form a resin solution when cold.

2. The method of making a urea-formaldehyde condensation product which comprises condensing in the presence of an alkaline catalyst at least 2 moles of formaldehyde and 1 mole of urea in an aqueous solvent mixture comprising water and a volatile organic solvent, said solvent mixture producing a solvent for the initial ingredients and for the condensation product at the end of the reaction, said reaction mass having initially at least 1 part by weight of formaldehyde to 1.2 parts by weight of water, and a non-aqueous solvent component miscible with water, said reaction being carried out at a temperature from 57° C. to 80° C. for a period from 2 to 6 hours to form a homogeneous reaction solution containing a condensation product, the longer time corresponding to the lower temperature; reducing the aquosity arising from water in the ingredients employed to not more than 20% by weight by adding to the mass a solvent alcohol boiling at over 100° C. and miscible with the reaction mass when beginning the next step; heating and distilling the mass in the presence of weak acid catalyst having a dissociation constant in the range from 0.000214 to 0.14 and being one which has an anion-forming portion of its molecule non-hydrolyzable to form an acid having a dissociation constant greater than 0.14, whereby the mass becomes homogeneous without gelling; continuing said distillation until the mass becomes a syrup at a temperature of at least 94° C.; then continuing the distillation in the presence of strong acidic catalyst of such character that if used in place of said weak acid catalyst it will produce gelling in the mass; and continuing said distillation to a temperature of the mass well over 100° C. to remove residual water and excess alcohol and to provide a substantially water-free homogeneous syrup capable of dilution with a solvent to form a resin solution when cold.

3. The process of claim 1 in which for the acid condensation the alcohol is provided in two installments, one being added before the distillation and being of lower boiling point than the second, and the second being added during the distillation and being of higher boiling point than the first, whereby the second one preferentially enters the condensation product permitting distillation away of at least a part of the first.

4. The process of claim 2 in which for the acid condensation the alcohol is provided in two installments, one being added before the distillation and being of lower boiling point than the second, and the second being added during the distillation and being of higher boiling point than the first, whereby the second one preferentially enters the condensation product permitting distillation away of at least a part of the first.

5. The method of making a urea-formaldehyde condensation product which comprises condensing in the presence of an alkaline catalyst at least 2 moles of formaldehyde and 1 mole of urea in an aqueous solvent mixture comprising water and a butanol, said solvent mixture producing a solvent for the initial ingredients and for the condensation product at the end of the reaction, said reaction mass having initially at least 1 part by weight of formaldehyde to 1.2 parts by weight of water, said reaction being carried out at a temperature from 57° C. to 80° C. for a period from 2 to 6 hours to form a homogeneous reaction solution containing a condensation product, the longer time corresponding to the lower temperature; reducing the aquosity arising from water in the ingredients employed to not over 20% by weight by adding to the mass n-butanol; heating and distilling the mass in the presence of weak acid catalyst having a dissociation constant in the range from 0.000214 to 0.14 and being one which has an anion-forming portion of its molecule non-hydrolyzable to form an acid having a dissociation constant greater than 0.14, whereby the mass becomes homogeneous without gelling; continuing said distillation until the mass becomes a syrup at a temperature of at least 94° C.; then continuing the distillation in the presence of strong acidic catalyst of such character that if used in place of said weak acid catalyst it will produce gelling in the mass; and continuing said distillation to a temperature of the mass well over 100° C. to remove residual water and excess alcohol and to provide a substantially water-free homogeneous syrup capable of dilution with a solvent to form a resin solution when cold.

6. The process of claim 5 in which for the acid condensation n-butanol is provided in two installments, one being added before the distillation, and the second being added during the distillation.

7. The process of claim 5 in which the reaction in the presence of the stronger acidic catalyst is carried out in the presence of additional solvent alcohol of boiling point not lower than that of the said n-butanol.

8. The process of claim 5 in which the reaction in the presence of the stronger acidic catalyst is carried out in the presence of additional solvent alcohol of boiling point higher than that of the said n-butanol.

9. The method of making a urea-formaldehyde condensation product which comprises condensing in the presence of an alkaline catalyst at least 2 moles of formaldehyde and 1 mole of urea in an aqueous solvent mixture comprising water and a volatile organic solvent, said solvent mixture producing a solvent for the initial ingredients and for the condensation product at the end of the reaction, said reaction mass having initially at least 1 part by weight of formaldehyde to 1.2 parts by weight of water, and a non-aqueous solvent component miscible with water, said reaction being carried out at a temperature from 57° C. to 80° C. for a period from 2 to 6 hours to form a homogeneous reaction solution containing a condensation product, the longer time corresponding to the lower temperature; reducing the aquosity arising from water in the ingredients employed to 20% by weight by adding to the mass n-butanol; heating and distilling the mass in the presence of a weak acid catalyst having a dissociation constant in the range from 0.000214 to 0.14 and being one which has an anion-forming portion of its molecule non-hydrolyzable to form an acid having a dissociation constant greater than 0.14, whereby the mass becomes homogeneous without gelling; continuing said distillation until the mass becomes a syrup at a temperature of at least 94° C.; then continuing the distillation in the presence of strong acidic catalyst of such character that if used in place of said weak acid catalyst it will produce gelling in the mass; and continuing said distillation to a temperature of the mass well over 100° C. to remove residual water and excess alcohol and to provide a substantially water-free homogeneous syrup capable of dilution with a solvent to form a resin solution when cold.

10. The process of claim 9 in which the reaction in the presence of stronger acidic catalyst is carried out in the presence of additional solvent alcohol of boiling point not lower than that of the said n-butanol.

11. The process of claim 9 in which the reaction in the presence of stronger acidic catalyst is carried out in the presence of additional solvent alcohol of boiling point higher than that of the said n-butanol.

12. The process of claim 9 in which the stronger acidic catalyst is hydrochloric acid.

13. The method of producing urea-formaldehyde condensation product which comprises condensing one mole of urea and at least 2 moles of formaldehyde in the presence of an alkaline catalyst and in the presence of a solvent mixture containing water in amount not greater than 1.2 parts to 1 part of formaldehyde at a temperature from 57° C. to 80° C. for a period of time from 2 to 6 hours, the longer time corresponding to the lower temperature, whereby to form a homogeneous solution of a reaction product, continuing the condensation in an aqueous alcoholic solution having alcohol boiling at over 100° C. and having an aquosity arising from water in the ingredients employed of not more than 20% by weight, while distilling water from the mass to attain a temperature of at least 94° C. in the presence of acid catalyst having a dissociation constant in the range from 0.000214 to 0.14 and being one which has an anion-forming portion of its molecule non-hydrolyzable to form an acid having a dissociation constant greater than 0.14, whereby to advance the condensation with avoidance of gelling of the aqueous mass; and continuing the distillation at a temperature over 100° C. in the presence of an acid catalyst having a dissociation constance greater than 0.14 and in the presence of solvent alcohol boiling at over 100° C., whereby to form substantially a water-free homogeneous syrup which is capable of dilution with a solvent to form a resin solution when cold.

14. In the process of furthering the condensation of the alkali-catalyzed reaction product of one mole of urea and at least 2 moles of formaldehyde, the steps which comprise reacting the product in the presence of weak acid catalyst having a dissociation constant in the range from 0.000214 to 0.14 and being one which has an anion-forming portion of its molecule non-hydrolyzable to form an acid having a dissociation constant greater than 0.14, in an aqueous alcoholic solvent having alcohol boiling over 100° C. and having an aquosity arising from water in the ingredients employed of not over 20% by weight of the reaction mass, while distilling water from the mass to a mass temperature of at least 94° C.; and thereafter continuing the distillation whereby to remove solvent alcohol boiling over 100° C. and to advance the condensation in the presence of stronger acidic catalyst of such character that if used for said weak acid catalyst it will cause gelling of the aqueous mass.

PLINY O. TAWNEY.